(12) United States Patent
Born

(10) Patent No.: US 8,307,436 B2
(45) Date of Patent: Nov. 6, 2012

(54) TRANSFORMATIVE RENDERING OF INTERNET RESOURCES

(75) Inventor: Frank H. Born, Westernville, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 372 days.

(21) Appl. No.: 12/802,458

(22) Filed: May 13, 2010

(65) Prior Publication Data

US 2010/0319070 A1 Dec. 16, 2010

Related U.S. Application Data

(60) Provisional application No. 61/269,558, filed on Jun. 15, 2009.

(51) Int. Cl.
*G06F 7/04* (2006.01)
*H04L 9/32* (2006.01)

(52) U.S. Cl. ............... 726/22; 726/23; 726/24; 726/25; 726/26; 713/187; 713/188; 713/189

(58) Field of Classification Search ................ 726/22
See application file for complete search history.

(56) References Cited

U.S. PATENT DOCUMENTS 6,938,170 B1 * 8/2005 Kraft et al. .................. 726/23
2006/0075241 A1 * 4/2006 Deguillaume et al. ........ 713/176

* cited by examiner

*Primary Examiner* — Longbit Chai
(74) *Attorney, Agent, or Firm* — Joseph A. Mancini

(57) ABSTRACT

Apparatus and method for transforming internet resources into safely rendered versions of the same. The invention provides transformative rendering of internet resources to remove malicious code before displaying in a browser or its associated application. Malicious code blockage is accomplished by re-writing all code that is to be transferred to the client browser. Since malicious code is often disguised (or obfuscated), the invention will not attempt to rewrite the entire code set on the page but will still make available the functionality of that code through frequent interaction between the invention's rendering processor and the client browser.

9 Claims, 3 Drawing Sheets

TRANSFORMATIVE RENDERING OF INTERNET RESOURCES

PRIORITY CLAIM UNDER 35 U.S.C. §119(e)

This patent application claims the priority benefit of the filing date of a provisional application Ser. No. 61/269,558, filed in the United States Patent and Trademark Office on Jun. 15, 2009.

STATEMENT OF GOVERNMENT INTEREST

The invention described herein may be manufactured and used by or for the Government for governmental purposes without the payment of any royalty thereon.

BACKGROUND OF THE INVENTION

The World Wide Web provides an incredible wealth of information but at the same time it also carries a vast amount of malicious code (often termed "malware"). Web pages provide a platform from which attackers will try to infect personal computers with viruses, Trojan horses and other malicious code. The vast majority of personal computer infections now come through Web based malware. Web browsers provide an avenue for direct compromise of the user's machine. In many cases all it takes is for the user to navigate to an infected Web site and an exploit will automatically infect their machine. To date there have been tens of millions to possibly hundreds of millions of personal computers that have been infected through Web borne exploits but there has been little progress in developing defenses against previously unknown attacks until the particular attack has been used, detected and analyzed.

Many Web sites are created just for the purpose of hosting malware. These largely consist of pornographic sites, gambling sites, or sites that capitalize on celebrity news or other hot search topics. Users are often educated to stay away from this type of site because of their likelihood to infect their computer. The more insidious threat comes from legitimate Web sites that have themselves been hacked and the attackers have planted malicious code on the site. There is no way of anticipating which of these sites have been hacked and therefore pose a security threat to visitors. News sites, on-line stores, government sites even computer security sites have all played the role of innocent host to the malicious code.

Malicious code is often obfuscated such that the malicious purpose(s) of the code is disguised. Defense against malicious code is often based on detection of known malicious code signatures. This type of defense breaks down quickly for two reasons; first, the signatures of malware are frequently changed to evade detection and second, the signatures do not yet exist for new attacks that have not been detected previously.

With the high likelihood of users being attacked via the Web, and the shortcomings of the current means for detection of incoming attacks, there exists a great and urgent need to insulate browsers from this malicious code without requiring the signatures of every known (and as yet unknown) attack type.

OBJECTS AND SUMMARY OF THE INVENTION

One objective of this present invention is to provide a method and apparatus to totally block all malicious code from accompanying an internet web page that is downloaded from the internet.

Another objective of this effort is to provide a method and apparatus to totally block all malicious code from accompanying other types of documents that are downloaded from the internet.

Another object of the present invention is to provide a method and apparatus for removing all malicious code from the Web pages without having to understand the purposes of each portion of the code to determine whether it is malicious or not.

Briefly stated, the present invention provides a method and apparatus for the transformative rendering of internet resources such that all malicious code will be removed from those resources before displaying it in the browser or its associated application. Complete malicious code blockage is accomplished by re-writing all code that is to be passed on to the client browser. Since malicious code is often disguised (or obfuscated), the rendering processor will not attempt to rewrite the entire code set on the page but will still make available the functionality of that code through frequent interaction between the rendering processor and the client browser.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
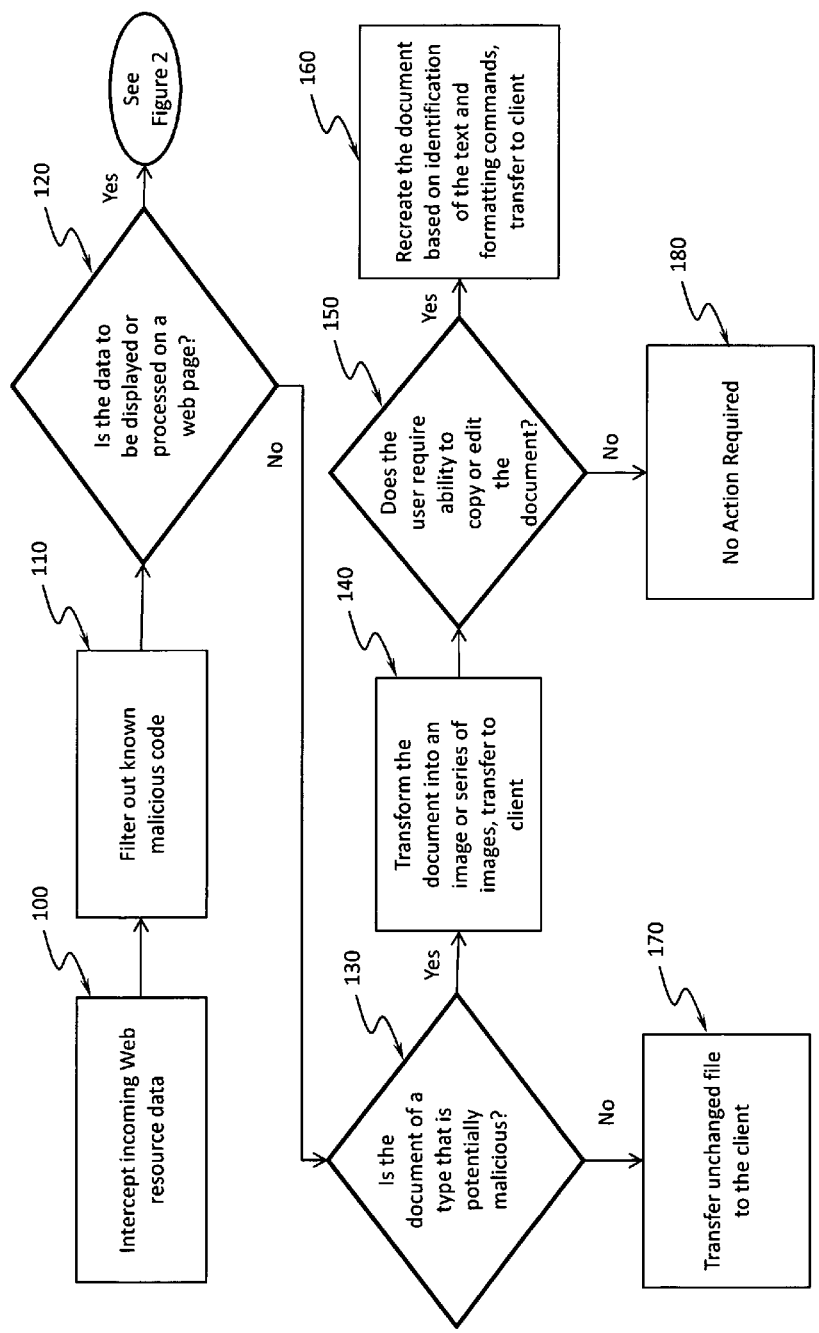
FIG. 1 depicts a flow diagram that shows the steps for transformative rendering of internet resources.

The present invention safeguards web browsing and Internet document retrieval by transforming the documents and web pages retrieved through the Web browser. In particular, the present invention removes malicious code from these Internet based resources before they are displayed in the Web browser or associated application.

The present invention provides a method and apparatus for removing all malicious code from Internet based documents before they are received by a client browser. This is achieved without having to parse the code on those documents to determine which portions of the code are safe and which are malicious. The preferred and typical embodiment of the present invention utilizes a rendering processor that sits between the client's browser and the Internet resources that they will access through the Web browser (or through the browser's associated applications). Requests to and responses from the Internet pass through this rendering processor. The rendering processor is capable of completely reconstructing all portions of the Internet resource that are passed on to the client's Web browser such that none of the original code from said resource is passed on to the client. Interactivity within the original code that cannot be safely reconstructed in the code that is passed to the client will largely be duplicated on the rendering server and passed to the client browser in small portions as mouse events passed from the client machine indicate the need for those elements.

The preferred method for re-writing web page code comprises having the rendering processor create a screen capture or "screenshot" of each page and then utilize the screen capture as the background for an image map on which other elements of the page can be placed. Some functions of the web page (i.e. JavaScript functions such as form validation) are not passed to the client but are instead made accessible via AJAX (Asynchronous Javascript and XML) enabled interaction between the client and the rendering processor. This invention enumerates aspects such as the location and function of the rendering processor, methods for structuring the transformed resources and interaction between the rendering processor and the client. One method for transformation of Web pages starts with having the rendering processor create a full size screenshot of the Web page. This screenshot is then used to create an image map on which many of the Web page elements will be positioned or overlaid. For example, links and form elements can be displayed on top of the image map either through the use of visible or invisible layers or through absolute positioning of these elements at the correct location within the image map. Interactivity within the original code of the Web resource may need to be duplicated on the rendering processor rather than passing on untrustworthy code to the client browser. For example, form validation is typically accomplished by JavaScript that runs in the client browser. In the preferred embodiment of the present invention, such form validation must occur in the rendering processor so that potentially untrustworthy code (JavaScript) will not be passed on to the client browser. AJAX code that is written by the rendering processor is used to pass data from each form field back to the rendering processor. The original JavaScript code can be run on the rendering processor to validate the form entries. Other examples of interactivity that may be handled by the present invention include a calculation (i.e., a mortgage calculator) or pop-ups that display after a mouse-over event. In the case of the calculator, the inputs that are provided by the user are passed on to the rendering processor and the results, calculated by the original code on the rendering processor, are passed automatically back to the client browser. The mouse-over event can, for example, trigger passing a certain display item in an overlay of the web page.

The Internet resource transformation referred to above would typically be done on a standalone processor, perhaps even a server, but it is not necessarily so limited. The rendering function (content transformation) may also be accomplished by the present invention on a separate partition on the client machine or on some other location such as an Internet proxy, gateway or router. The location of the rendering processor is not a critical element in the present invention except that the original code of the Internet resource cannot be run in a location on the client machine where it could be used to infect the client machine. One advantage of the use of a rendering processor that is separate from the client computer processor is that the utilization of the present invention would not require any software installation on the client computer processor.

Browser access to the rendering processor is accomplished in different ways depending on the location of the rendering processor and the connection between the rendering processor and the client computer processor. Rendering processors can be placed at the gateways to the Internet such as at Internet Service Provider (ISP) or a corporate Internet gateway. In other cases the rendering processor can be accessible via the Web through a secure Internet connection Web based Virtual Private Network (VPN).

Depending on where the rendering processor is located in relation to the client, there are differences in both the function of the rendering processor and the client browsing experience.

In the cases where the rendering processor is located at the ISP, Gateway, or proxy server, all client requests are automatically passed through the rendering processor regardless of where these Web based resources are drawn from. In this case there is no need for the rendering processor to edit the addresses in links to ensure that the resulting page will be accessed through the rendering processor.

In the case where the rendering processor is made accessible through the Web (rather than through a device that is in-line between the client and the internet), there is a need for the rendering processor to ensure that all future page requests are re-routed back through the rendering processor. Resources that bypass the rendering processor are transported directly to the browser in their original (potentially dangerous) form. For this situation there is the need for a "browser in a browser" functionality. This browser functionality is duplicated at the top of a frame based web page with the transformed web pages displaying in a main frame below. Functions such as the address bar, history, favorites, back and forward button and other toolbar links are duplicated in the top frame so that the user does not access these functions through the main browser window and therein have the page they just requested bypass the rendering processor. This frame that holds the browser functions remains visible to the user throughout the session and provides access to these important functions at all times.

In some respects the present invention involves a transfer of risk from the client machine to the rendering processor. While this is true there are many benefits of the present invention to offset that risk. It must be understood that the rendering processor, typically a server, will be configured much differently than a client computer. While the client computer will have many applications that it runs, the rendering processor will have few applications and therefore presents less attack vectors. Also, the rendering processor will likely be run on a more secure operating system and it will be much easier to keep this processor up to date with patches than it would be to update the many clients that it will service. Another benefit of this approach is that the processor can host some robust malware filtering mechanisms and also it can be refreshed regularly via a virtual machine structure.

With regard to how the present invention will handle Web 2.0 technologies or dynamic content, Web 2.0 indicates so far that the content of the site is user contributed. The complexity involved in this type of web site affects the Web server rather than the client computer. Therefore, Web 2.0 generally does not present any additional challenges to the present invention. Dynamic content such as that provided by AJAX (Asynchronous JavaScript and XML) can present added difficulty to the implementation of the invention. Data receipt from the Web server will continue over the entire time that the Web page is open. This data must be passed to the client and integrated into, or overlaid on top of the client version of the Web page.

Figure 2:
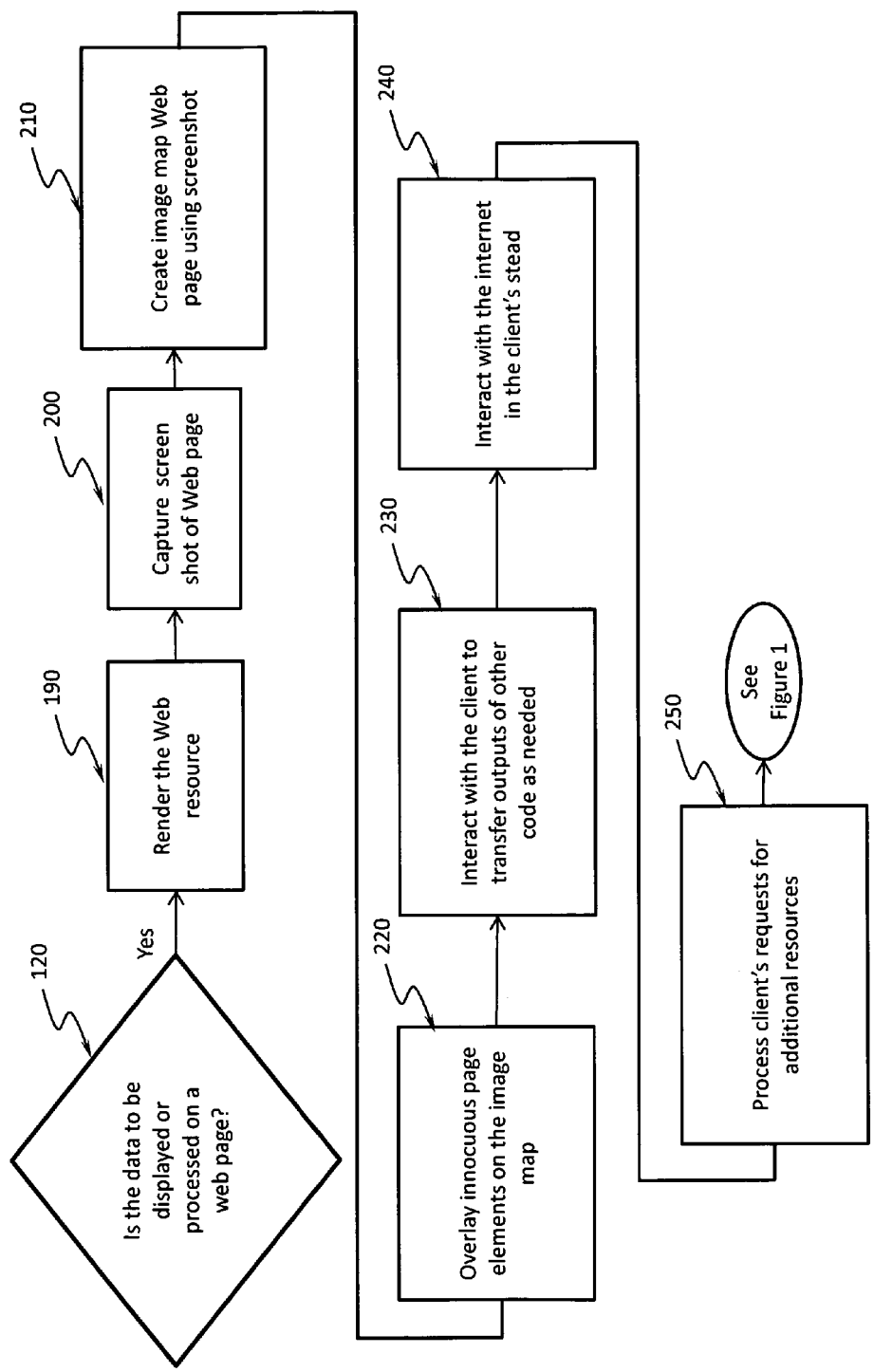
FIG. 2 continues the flow chart of FIG. 1 and depicts a flow diagram that shows the steps for transformative rendering of internet resources other than Web pages.

FIG. 1 and FIG. 2 each contain a flow chart of the present invention process steps for transformative rendering of internet resources. Referring to FIG. 1, the first action 100 is to intercept data that is being sent to the client's Web browser. This interception of data will be done by the rendering processor. The rendering processor can take many physical forms and can be placed at numerous locations in relation to the client browser. These varied locations fall into two distinct categories: 1) in-line between the client and the internet and 2) external to the client-internet connection. The actions of the rendering processor will differ slightly depending on whether or not the rendering processor is in-line between the client and the internet.

After the Web data is intercepted the rendering processor should utilize existing technologies (such as anti-virus or anti-spyware software programs) to filter out known malicious content from the data 110. The purpose of this is to minimize the possibility that the rendering processor could get hacked or corrupted. Other existing security measures should also be in place to minimize the potential for the rendering processor being successfully attacked.

Depending on whether the data that has been intercepted is meant to be displayed in a Web page will affect the subsequent steps of this invention 120. Note that the primary task of the present invention is to provide the safe transformation of Web pages but there are also some novel considerations in the safeguarding of users from malicious code in web based documents. If the data intercepted by the rendering processor comprises a document other than a Web page (i.e. PDF, MS Word, PowerPoint, text file etc) then the rendering processor will first determine if the document is of a type that can potentially be malicious 130. If the document type cannot contain malicious code then it will be transferred to the client unchanged 170. Next, the present invention transforms the document to an image or series of images and transfer to the client 140. The present invention then determines if the user requires other than a visual representation of the document 150. For example, does the user wish to copy text out of the document or edit the document? If the answer is yes then the image transformation by itself 140 will not meet the user's needs. The document can be transformed using an alternate method that re-creates the document based on an understanding of the text and formatting commands contained in the document 160. This re-created document is then transferred on to the client 160.

FIG. 2 contains the continuation of the invention process steps that began in FIG. 1. This portion of the flow charts shows the steps that are involved in the transformation of a Web page (or of data that will be included in a Web page). For the purposes of this invention the term Web page is defined as a file that utilizes some form of Hypertext Markup Language (HTML) and is displayed primarily in a browser. This would include files with filename extensions such as html, htm, asp, jsp, cfm and many others. It should be noted that Web pages are distinct from many other file types in that the content in a single page can come from multiple network locations and also can receive additions or updates to portions of the Web page while the client is viewing said page. For this reason the disclosure of the present invention often uses the term "data" rather than "pages" or "files".

When a Web page is at the rendering processor, the code on the page will be executed (rendered) in order to create the intended representation of the page 190. Subsequent data that is to be added to the page at a later time will also be rendered 190. A screenshot of the rendered data will be taken 200 and a new Web page (or portion of a Web page) will be created by using the screenshot of the page as the background image in an html image-map format 210. Elements from the Web page that are innocuous (i.e. links and form elements) will be overlaid on top of the image map 220. Other elements (i.e. JavaScript elements) will not be passed on to the client but will be executed on the rendering processor as necessary for the client 230. The re-created web page will need to have elements in it to enable continuing interaction between the rendering processor and the client browser. This interaction will be required to ensure that the client can receive updates to the page as they come from the internet and to allow the client to receive output from JavaScript or other functions that were not transferred to the client.

The rendering processor will be required to interact with the internet in the client's stead 240. This will involve maintaining identity with the original server for the Web page as if the client were directly accessing the pages. Cookies (small data files to uniquely identify the customer) will be written by the Web page on the rendering processor in a separate location for each client that the rendering processor supports. In turn, the rendering processor will have to maintain identity of each client. This will also typically be done through the use of cookies that will be written on the client computer.

Finally the rendering processor is responsible for processing the client's requests for additional internet resources 250. When a new resource is received the process shown in FIG. 1 and FIG. 2 will repeat.

Figure 3A:
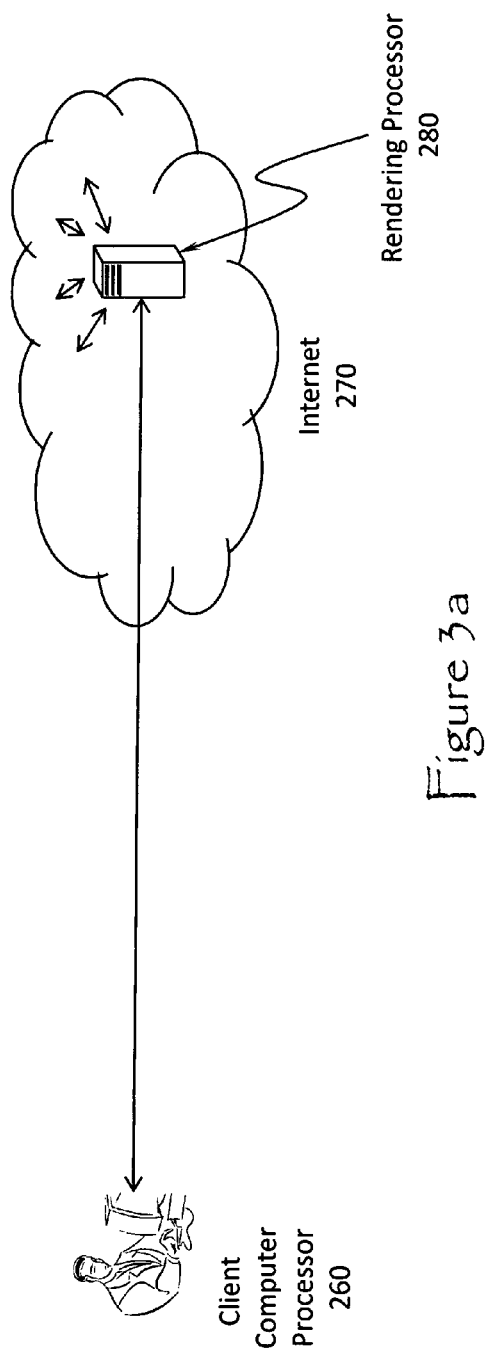
FIG. 3a depicts the relationship between client, the internet and this invention in the case when the invention is accessed through the internet.
Figure 3B:
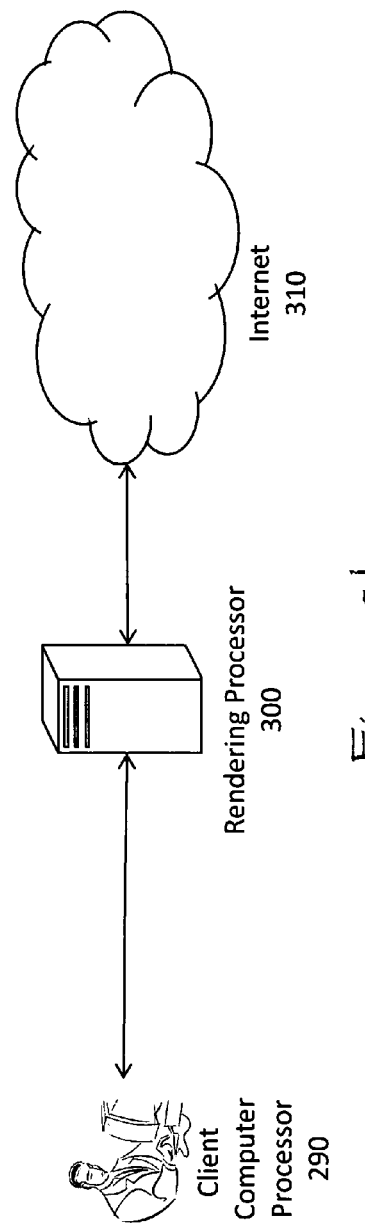
FIG. 3b depicts the relationship between client, the internet and this invention in the case when the invention is in-line between the client and the internet.

FIG. 3a and FIG. 3b represent the two general categories of placement for the rendering processor in relation to the client and the internet. FIG. 3a shows the rendering processor 280 (in this case it is a Web server) in the cloud representing the internet 270. Access to the rendering processor will be through the client computer processor 260 browser address bar or through setting the proxy location in the client browser settings. This type of access would be available to anyone on the internet without installing any software or hardware and could be paid for by fee or advertisements. When the rendering processor 280 is accessed through the internet 270 without setting it up as a proxy it is necessary for the rendering processor to ensure that the user does not bypass the rendering processor by using the normal browser functions such as the address bar, history, favorites, toolbars or navigation buttons. For this reason the rendering processor will need to incorporate browser like functionality in the pages that it passes to the client. This will allow the user to navigate without leaving the protection of the rendering processor.

FIG. 3b shows the rendering processor 300 in between the client computer processor 290 and the internet 310. This "in-line" connection assures that all traffic between the internet and the client browser will go through the rendering processor. In this situation there is no need for the browser in a browser functionality mentioned in the description of FIG. 3a. This situation is representative of the use of this invention by Internet Service Providers (ISP) or corporate/government internet gateways. The setup ensures that all traffic will route through the rendering processor.

What is claimed is:

1. An apparatus for transforming internet resources into safely rendered versions of the same, comprising:
   a computer;
   a computer software program containing computer executable instructions stored on a non-transitory medium, which, when read by said computer to filter out known malicious code, and when said internet resource is a Web page, will render Web page contents of said internet resources by
   capturing a screen shot of said Web page;
   creating an image map of said Web page using said screen shot;
   overlaying innocuous Web page elements on said image map;
   interacting with said client's computer to transfer outputs of other code;
   interacting with the internet in said client's computer's stead; and
   processing a client's requests for additional Web resources.

2. The apparatus of claim 1, wherein when said internet resource is a document and when said client requires the ability to copy or edit said document, then said computer executable instructions will recreate said document based on an understanding of the text and formatting commands; and transfer said recreated said document to said client computer;

otherwise, take no further action.

3. The apparatus of claim 1 wherein interactivity within the code of said internet resource is duplicated on said computer.

4. The apparatus of claim 3, wherein said computer writes Asynchronous Javascript and XML (AJAX) code for passing data back and forth between said computer and said client computer.

5. A method for transforming internet resources into safely rendered versions of the same, comprising the steps of:

configuring a client computer and a connection to the internet;

when read by said computer to filter out known malicious code, and when said internet resource is a Web page;

rendering said Web page contents of said internet resources;

capturing a screen shot of said Web page;

creating an image map of said Web page using said screen shot;

overlaying innocuous Web page elements on said image map;

interacting with said client computer to transfer outputs of other code;

interacting with the internet in said client computer's stead; and processing client's requests for additional internet resources.

6. The method of claim 5, wherein when said internet resource is a document and when user requires the ability to copy or edit said document, then said method further comprises the steps of:

recreating said document based on an understanding of the text and formatting commands; and transferring said recreated said document to said client computer;

otherwise, said method further comprises the step of taking no further action.

7. The method of claim 5, further comprising the step of duplicating interactivity within the code of said internet resource.

8. The method of claim 7, further comprising the step of writing Asynchronous Javascript and XML (AJAX) code for passing data to and from said client computer.

9. The method of claim 7, further comprising the step of creating a browser within a browser functionality within a recreated Web page.

* * * * *